US008283027B2

(12) United States Patent
Melde et al.

(10) Patent No.: US 8,283,027 B2
(45) Date of Patent: Oct. 9, 2012

(54) COMPOSITE FOR CONTROLLED RELEASE OF SMALL MOLECULES IN AQUATIC ENVIRONMENTS

(75) Inventors: Brian Melde, Alexandria, VA (US); Michael A. Markowitz, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 174 days.

(21) Appl. No.: 12/813,916

(22) Filed: Jun. 11, 2010

(65) Prior Publication Data
US 2011/0305894 A1 Dec. 15, 2011

(51) Int. Cl.
B32B 3/26 (2006.01)
C09D 5/16 (2006.01)

(52) U.S. Cl. ............... 428/307.3; 428/305.5; 428/315.5; 428/315.7; 523/122

(58) Field of Classification Search ............... 428/305.5, 428/307.3, 315.5, 315.7; 523/122
See application file for complete search history.

(56) References Cited

U.S. PATENT DOCUMENTS

| 7,172,770 | B2 | 2/2007 | Ma et al. |
| 2004/0132958 | A1 | 7/2004 | Deming et al. |
| 2005/0260265 | A1 | 11/2005 | Wyrsta |
| 2006/0034924 | A1 | 2/2006 | Wyrsta et al. |
| 2006/0217456 | A1* | 9/2006 | Pelzer et al. ............... 523/122 |
| 2007/0112242 | A1* | 5/2007 | Edmiston .................... 588/249 |
| 2007/0256978 | A1 | 11/2007 | Stucky et al. |
| 2007/0275068 | A1* | 11/2007 | Martens et al. ............... 424/484 |
| 2008/0277578 | A1 | 11/2008 | Ferrari et al. |
| 2009/0061226 | A1* | 3/2009 | Banin et al. .................... 428/402 |
| 2009/0186226 | A1 | 7/2009 | Chaumonnoi et al. |
| 2009/0192205 | A1 | 7/2009 | Augustijns et al. |
| 2009/0311190 | A1* | 12/2009 | Gracias et al. ................ 424/9.3 |

OTHER PUBLICATIONS

Kresge, et al., Nature, 359, 710-712, (Oct. 22, 1992).
Lai, et al., J. Am. Chem. Soc. 125 (15): 4451-4459 (2003).
M. Kruk, M. Jaroniec, Chem. Mater. 13 (2001) 3169-3183.
Mal, et al. Nature, 421, 350-353 (2003).
Mal, et al., Chem. Mater.15 (17): 3385-3394, (2003).
Nguyen, et al., Proc. Nat. Acad. Sci. USA 102 (29): 1 0029-10034 (2005).
Pluronic® F127 Block Copolymer Surfactant, BASF Corp. Tech. Bulletin, 2002.
S.A. Bagshaw, E. Prouzet, T.J. Pinnavaia, Science 269 (1995) 1242-1244.
S.A. Bagshaw, T.J. Pinnavaia, Angew. Chem. Int. Ed. Engl. 35 (1996) 1102-1105.
Vallet-Regi, et al., Chem. Mater. 13 (2): 308-311 (2001).
Vallet-Regi, at al., Sol. State Ionics 172 (1-4): 435-439 (2004.

* cited by examiner

*Primary Examiner* — Hai Vo

(74) *Attorney, Agent, or Firm* — Amy Ressing; Roy Roberts

(57) ABSTRACT

A composite material formulated for slow release of a small molecule in seawater includes a porous inorganic oxide framework and micelles embedded within the pores of the framework. The micelles include a surfactant and a small molecule, the surfactant being present in the composite material at no more than 80 parts by weight per 100 parts by weight inorganic oxide, the composite material being stable in seawater for releasing the small molecule over at least 20 days.

23 Claims, 5 Drawing Sheets

COMPOSITE FOR CONTROLLED RELEASE OF SMALL MOLECULES IN AQUATIC ENVIRONMENTS

BACKGROUND

The exemplary embodiment relates to a controlled release material for delivering small molecules into an aquatic environment. It finds particular application in connection with a composite material in which a micellized anti-foulant compound or composition is held within pores of a mesoporous or microporous oxide structure by a surfactant.

In aquatic environments, such as seawater or freshwater in lakes and rivers, biofouling of ships and other structures by biofilms made up of bacteria, algae, seaweed and the like as well as attachment of larger organisms such as barnacles, mussels, and tubeworms, can cause a variety of problems. Such biofoulants on a ship's hull can add considerably to the drag, which increases fuel consumption and green house gas emissions, and can also result in corrosion.

Antifouling paints and coatings have been developed to reduce buildup of biofoulants. A number of the marine antifoulant approaches are environmentally unsuitable since they use antifoulants that are considered pollutants. Several new approaches include controlled release of a nonpolluting agent specific to particular fouling organisms or to its adhesive chemistry and release of an agent that keeps renewing a non-adhesive surface, e.g., silicone, which may slough off continuously.

Biofouling of underwater sensors which rely on transmission of light is also a problem. Ocean bottom sensor nodes and Unmanned or Autonomous Underwater Vehicles (UUVs, AUVs), for example, may be equipped with sensors, and can be used for tactical surveillance applications and in situ long term monitoring for oceanographic data collection, pollution monitoring, and offshore exploration. However, deploying such a sensor in seawater or subsurface environments for extended periods of time exposes it to chemical and microbial degradation. Underwater sensors are thus prone to failures because of fouling, corrosion, and the like, and even the most advanced sensor systems may be rendered useless in a short period of time, such as a few weeks. Frequent, labor intensive and expensive maintenance may be required to maintain such sensors operational. Current antifouling coatings may not provide sufficient antifouling protection or may interfere with a signal being sent and/or received by the sensor.

It is known to use mesoporous silica materials for slow release of drugs, such as ibuprofen and amoxicillin. See, for example, Vallet-Regi, et al., Chem. Mater. 13 (2): 308-311 (2001) and Vallet-Regi, et al., Sol. State Ionics 172 (1-4): 435-439 (2004). The release rates from the silica are fairly rapid, on the order of hours. Methods have been developed to slow the release rates, e.g., with a coumarin derivative grafted to pore openings (see, Mal, et al. Nature, 421, 350-353 (2003); and Mal, et al., Chem. Mater. 15 (17): 3385-3394, (2003)), or with other reversible plugging agents (see, e.g., Nguyen, et al., Proc. Nat. Acad. Sci. USA 102 (29): 10029-10034 (2005); and Lai, et al., J. Am. Chem. Soc. 125 (15): 4451-4459 (2003)). However, even with such complex release mechanisms, in all cases, release is largely complete after 96 hours or less.

Existing materials also tend to degrade very rapidly in seawater.

There remains a need for improved methods and systems for controlled release of antifoulants and other small molecules which are suited to marine environments.

INCORPORATION BY REFERENCE

The following references, the disclosures of which are incorporated in their entireties by reference, are mentioned:

US Pub. Nos. 20050260265 and 20060034924 entitled MESOSTRUCTURED SILICA/BLOCK COPOLYMER MONOLITHS AS A CONTROLLED RELEASE DEVICE AND METHODS OF MANUFACTURE, by Michael D. Wyrsta, disclose mesostructured silica/block copolymer composite monoliths as controlled release systems. The controlled release function is based on the formation of mesostructured silica/block copolymer architectures via surfactant-templated sol-gel processing. Multi-layered or gradient monoliths are produced by layer-by-layer sol-gel processing to provide pulsed and programmed release characteristics. A simple, rapid route to prepare combinatorial compositional monolith libraries provides high-throughput synthesis and rapid screening of the release characteristics of the monoliths.

US Pub. No. 20070256978, entitled BLOCK POLYMER PROCESSING FOR MESOSTRUCTURED INORGANIC OXIDE MATERIALS, by Galen D. Stucky, et al., discloses a mesoscopically ordered, hydrothermally stable metal oxide-block copolymer composite or mesoporous material formed by using amphiphilic block polymers which act as structure directing agents for the metal oxide in a self-assembling system.

BRIEF DESCRIPTION

In accordance with one aspect of the exemplary embodiment, a composite material is formulated for slow release of a small molecule in seawater includes a porous inorganic oxide framework and micelles embedded within the pores of the framework. The micelles include a surfactant and a small molecule, the surfactant being present in the composite material at no more than 80 parts by weight per 100 parts by weight inorganic oxide, the composite material being stable in seawater for releasing the small molecule over at least 20 days.

In one aspect a method of reducing biofouling includes immersing the thus described composite material in seawater, wherein the small molecule comprises an antifoulant which is released into the seawater over at least 20 days.

In accordance with another aspect of the exemplary embodiment, a method for preparing a composite material includes providing a liquid source of an inorganic oxide, hydrolyzing the liquid source of an inorganic oxide in a polar solvent to form a sol, incorporating a surfactant and a small organic molecule in the sol, the surfactant being present in the sol at no more than 80 parts by weight per 100 parts by weight of inorganic oxide. The sol is solidified to form the composite material in which the small molecule and surfactant are present in pores of the composite material.

In another aspect a composite material comprising a silica framework with diethylbenzene bridges, a block copolymer and an antifoulant composition being disposed in pores of the framework, the composite material maintaining sufficient integrity for release of the antifoulant over a period of at least 20 days.

DETAILED DESCRIPTION

Figure 1:
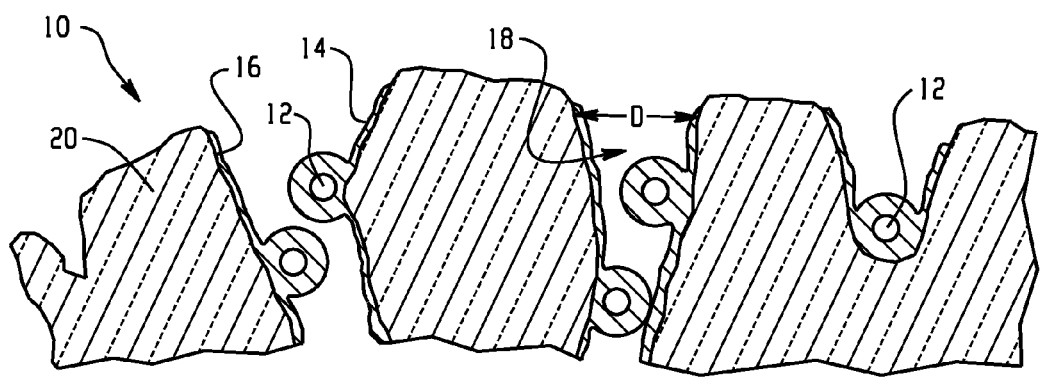
FIG. 1 is a greatly enlarged schematic sectional view of a composite material in accordance with the exemplary embodiment.

The exemplary embodiment relates to a composite material which includes a porous inorganic oxide framework with surfactant micelles embedded within the pores of the framework for long term release of an anti-foulant or other small organic molecule contained within the micelles. In various embodiments disclosed herein, a film, monolith, powder or coating is composed of a mesoporous or microporous inorganic oxide/surfactant/small molecule composite material for use as a controlled release media for the small molecule in aquatic environments.

The optically clear monolith, film, or particles formed by surfactant templating is capable of long term release of small molecules. Unlike existing surfactant templating methods, the surfactant is retained within the pores of the oxide framework, materials, and is present in a concentration range which avoids short-term degradation of the framework. In one embodiment, the surfactant allows for a slow release of an anti-foulant composition as the small molecule when the composite is immersed in water, for example over a period of about 20 days at a sufficient rate to inhibit biofouling. For example, the average release rate of the small molecule from the composite at between 10 and 20 days after immersion in seawater is at least 0.05 mg/g of composite per day and can be up to about 0.7 mg/g composite, or higher. Controlled release from similar materials that do not contain the surfactant either release relatively quickly (24-96 hrs) or not at all.

Exemplary composites are mechanically stable and stable to sea water salt environments.

In various aspects, the composite material is in the form of a monolith (a shaped body) of a predefined shape, such as a plate or lens, which is greater than 2 mm in at least one of its dimensions and in some embodiments greater than 1 cm in at least one dimension. Such a monolith is capable of being self supporting. In another embodiment, the composite may be in the form of a film, supported on a substrate. The film may have a thickness of at least 2 nm. The monolith or film may be optically clear and be predominantly (e.g., greater than 50% or greater than 90%) or entirely formed of the composite. All percentages herein are expressed by weight, unless indicated otherwise.

In other embodiments, the composite is in the form of a finely divided material, such as flakes or particles. The flakes or particles may be incorporated into a coating, such as a paint, in which the composite may be present in amounts of at least 1% or more, e.g., at least 5%. The paint may include a film-forming resin system and a pigment. Such a coating may be used to coat a ship's hull or underwater structure. When the hull is placed in water, the small molecule is released into the water. In other embodiments, the composite is in the form of a compacted mass of such particles or flakes.

The inorganic oxide forming the framework of the composite may be predominantly silica (e.g., the framework may be at least 50 wt % silica and in one embodiment at least 80 wt % or at least 90 wt % silica). The exemplary silica monolith disclosed herein provides a robust structure suitable for aquatic environments, such as seawater or other aquatic environments which include sodium chloride (salt) in amounts of 1% or more, typically over 3%. While the exemplary embodiment is described in terms of silica ($SiO_2$) as the inorganic oxide, metal oxides such as alumina ($Al_2O_3$) and titania ($TiO_2$), or a mixture of oxides may be used. The inorganic oxide framework may also be a hybrid inorganic-organic framework, for example, by including organic bridges between silica portions of the framework.

The silica or other inorganic oxide framework may have a mesoporous or microporous structure (i.e., in the absence of surfactant and small molecules). A mesoporous structure is defined as having pores with a diameter (size) of 2 to 50 nm as determined, for example, by the BET method, (referred to herein as "mesopores"), where pores in this range make up at least 90% of the open pores (i.e., pores accessible to the nitrogen gas used in measurements) in the composite and the average pore diameter lies within this range. A microporous structure has an average pore size which is up to 2 nm.

As used herein, a small molecule can be any organic molecule having a molecular weight of up to 2000, e.g., up to 1000, and in some embodiments, 500 or less. In various embodiments, the small molecule includes an antifouling agent.

The exemplary small molecules are bound within the pores of the silica structure. Specifically, as schematically illustrated in FIG. 1, in the composite material 10 the small molecules form liquid micelles 12 which are surrounded by a solid, semisolid, or liquid surfactant layer 14, which binds the micelles to walls 16 of pores 18 of the silica structure 20. As will be appreciated, the presence of the surfactant and small molecules within the pores renders the overall composite material 10 substantially non-porous. The surfactant includes both hydrophilic and hydrophobic parts. The hydrophilic parts bond to the pore walls, e.g., with ionic bonds or hydrogen bonds. The hydrophobic parts of the surfactant molecule are useful for micellizing the small organic molecule. In the exemplary embodiment, the micelles are shown as substantially spherical. However, it is to be appreciated that they may have a lamellar structure, with a longest dimension two or more times the smallest dimension. The micelles may have an average diameter of at least about 0.1 nm, e.g., up to 20 nm, e.g., less than 10 nm.

Figure 2:
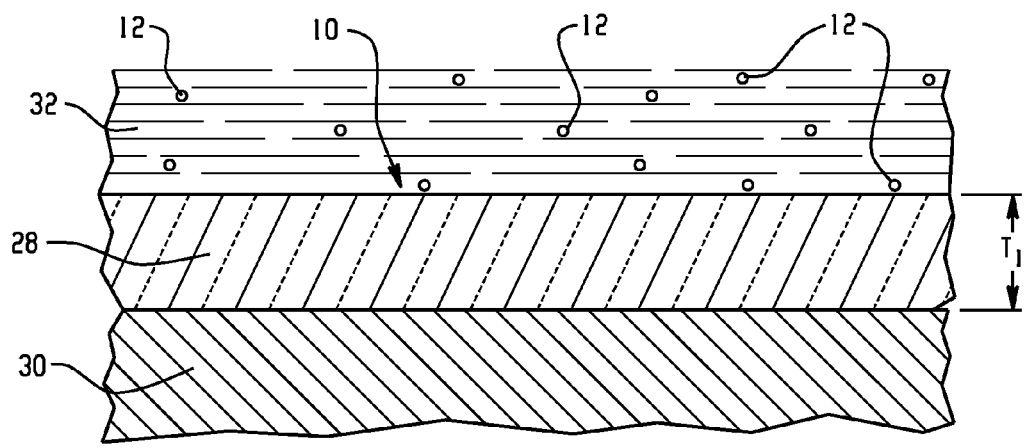
FIG. 2 is an enlarged side sectional view of a film formed of the exemplary composite on a supporting substrate in an aqueous environment.

As illustrated in FIG. 2, a continuous film 28 formed of the composite 10 having a thickness $T_1$ may be supported on a substrate 30, such as a hull of a ship, an optical sensor, or other structure. When immersed in water, such as seawater 32, the film releases the small molecules 12, such as an antifoulant agent or agents, into the water over an extended period of time. The antifoulant reduces the buildup of biofoulants on the substrate. The thickness $T_1$ of the film may be, for example, at least 100 nm.

Figure 3:
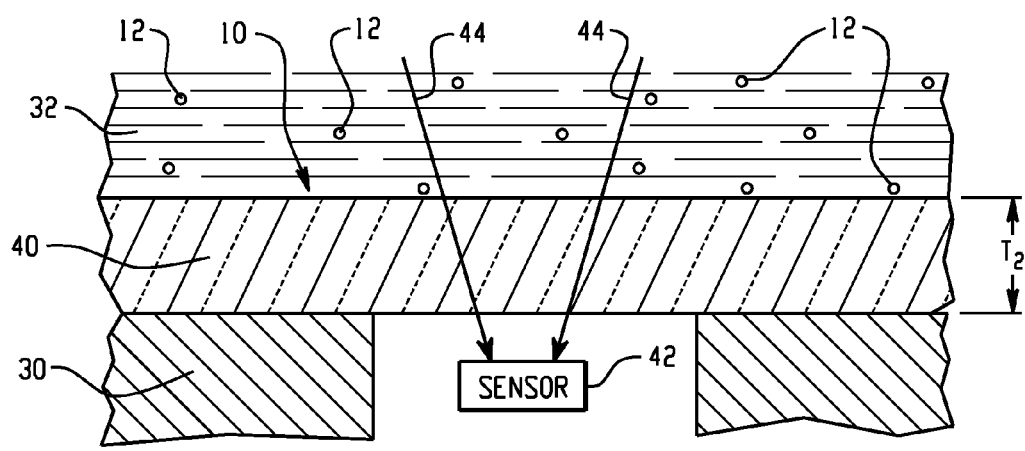
FIG. 3 is a side sectional view of a monolith formed of the exemplary composite protecting a sensor from biofoulant buildup in an aquatic environment.

As illustrated in FIG. 3, the composite 10 may take the form of a monolith 40, having a thickness $T_2$, which is sufficient for the monolith to be self supporting. The monolith 40 may be used as a lens for an optical sensor 42, such as a spectrophotometer. When immersed in water, such as seawater 32, the monolith 40 is interposed between the sensor 42 and the water 32. The monolith is optically transparent, allowing light rays 44 to pass though it to the sensor 42 and be detected. The monolith releases the small molecules 12, such as an antifoulant agent or agents, into the water over an extended period of time. The thickness $T_2$ of the monolith (its smallest dimension) may be, for example, at least 500 nm and in one embodiment at least 2 mm.

The composite material is formed by a sol gel process in which an inorganic oxide precursor, such as a liquid silica precursor, is hydrolyzed in the presence of a catalyst in a polar solvent at a suitable temperature for the hydrolysis to take place. An amount of the surfactant and the small molecule are incorporated with the silica precursor, prior to gellation of the silica, to form a reactant liquid mixture comprising surfactant, small molecule, silica precursor (or hydrolyzed silica), acid catalyst, and polar solvent. For example, the surfactant and small molecule can be added to the polar solvent prior to or after addition of the silica precursor and/or acid which results in a two phase composition. The hydrolyzed silica precursor polymerizes to form a silica gel. As the gel hardens, a mesoporous or microporous inorganic oxide structure forms in which the surfactant and small molecule are concentrated in the pores. Alcohol formed or used in the process can be removed by drying the gel under a light vacuum. If too much alcohol is present in the gel, it can disrupt the surfactant micelles. The gel may be heated to complete the polymerization of the silica and aid in the drying process. Heating can take place at any suitable temperature below the decomposition temperature of the small molecule and surfactant, e.g., from about 50-100° C., e.g., about 80° C. Exemplary surfactants are stable to a temperature of about 200° C. or higher. The result is a hardened composite material in which the pores of the solid polymerized silica are substantially filled with micelles of the small molecule bonded to the pore walls by the surfactant.

Exemplary catalysts for the hydrolysis include inorganic acids, such as hydrochloric acid, nitric acid, sulfuric acid, and combinations thereof. Inorganic bases can also serve as catalysts.

Exemplary polar solvents include water, alcohols, e.g., short chain ($C_1$-$C_6$) aliphatic alcohols, such as methanol, ethanol and isopropanol, ethers and ketones, and mixed solvents thereof. In one embodiment water is used as the sole polar solvent. In another embodiment a combination of water and an alcohol, such as methanol, is used as the polar solvent.

Exemplary silica precursors include liquid organosilicon compounds, such as bis(trimethoxysilylethyl)benzene (referred to herein as DEB since is provides diethylbenzene bridged silica), having a molecular weight of 374.58 ($C_{16}H_{30}O_6Si_2$), 1 mole of bis(trimethoxysilylethyl)benzene having an equivalent $SiO_2$ content of 2 moles, i.e., 187.29 g DEB/mol $SiO_2$; tetramethyl orthosilicate (TMOS), having a molecular weight of 152.25 ($Si(OCH_3)_4$), 1 mole of TMOS having an equivalent $SiO_2$ content of 1 mole; tetraethyl orthosilicate (TEOS), having a molecular weight of 208.33 ($Si(OC_2H_5)_4$), 1 mole of TEOS having an equivalent $SiO_2$ content of 1 mole; and other silicon alkoxides. Examples of other silica precursors include particulate silica such as fumed silica, precipitated silica and colloidal silica, and alkali metal silicates.

The term DEB-Si is used herein to refer to a silica framework comprising diethylbenzene moieties, which may be derived from bis(trimethoxysilylethyl)benzene (DEB). Organosilica nanocomposites containing diethylbenzene moieties integrated in the silica frameworks may be formed, for example, by using bis(trimethoxysilylethyl)benzene alone or a combination of the precursors TMOS and DEB. In one specific embodiment, the framework is derived from TMOS and DEB. In one embodiment, a ratio of moles of silica derived from DEB:moles silica derived from TMOS in the silica framework is at least 30:70. In another embodiment, the ratio is at least 40:60, and in yet another embodiment, the ratio is at least 50:50 or at least 70:30.

The surfactant is a compound which forms a micellar or lamellar aggregate with the small molecule and may be a cationic, anionic, zwitterionic, or nonionic compound having surface activity. A surfactant capable of forming a micelle may be selected according to the polar solvent chosen. The surfactant may be solid at room temperature (e.g., may have a melting point in excess of 30° C. or 40° C.) and may have an HLB number of at least 12, e.g., in the range of about 15-24. For example, surfactants comprising block copolymers having a weight average molecular weight in excess of about 2000, e.g., at least 5000, or at least 10,000, and in some embodiments up to 50,000, e.g., less than 20,000 may be used.

Exemplary surfactants are amphiphilic block copolymers (difunctional polymers possessing both hydrophilic and lipophilic properties), such as alkoxylated nonionic surfactants, in particular, ethoxylated and/or propoxylated primary alcohols. Such surfactants are polymers having blocks of polyethylene oxide (EO) and/or polypropylene oxide (PO). Each EO or PO block may be at least 30 monomer units in length. Examples of such block copolymers include EO-PO diblock polymers and EO-PO-EO and PO-EO-PO triblock or multiblock copolymers terminating in primary hydroxyl groups. An exemplary nonionic EO-PO-EO surfactant may contain at least 60 mol % polyethylene oxide, such as those available from BASF under the tradename PLURONIC (e.g., PLURONIC F127) with a representative formula of $EO_{106}PO_{70}EO_{106}$.

Other surfactants including nonionic surfactants and ionic surfactants may be used alone or in combination with the exemplary amphiphilic block copolymers. Exemplary nonionic surfactants include, but are not limited to, alkyl glucosides, alkyl polyglucosides, polyhydroxy fatty acid amides, sucrose esters, esters of fatty acids and polyhydric alcohols, fatty acid alkanolamides, ethoxylated fatty acids, ethoxylated aliphatic acids, ethoxylated fatty alcohols (e.g., octyl phenoxy polyethoxyethanol available under the trade name TRITON X-100 and nonyl phenoxy poly(ethyleneoxy)ethanol available under the trade name NONIDET P-40, both from Sigma, St. Louis, Mo.), ethoxylated glycerides, ethoxylated block copolymers with ethylene diaminetetraacetic acid (EDTA), ethoxylated cyclic ether adducts, ethoxylated amide and imidazoline adducts, ethoxylated amine adducts, ethoxylated mercaptan adducts, ethoxylated condensates with alkyl phenols, ethoxylated nitrogen-based hydrophobes, ethoxylated polyoxypropylenes, polymeric silicones, fluorinated surfactants (e.g., those available under the trade names FLUORAD-FS 300 from 3M Co., St. Paul, Minn., and ZONYL from Dupont de Nemours Co., Wilmington, Del.), and polymerizable (reactive) surfactants (e.g., SAM 211 (alkylene polyalkoxy sulfate) surfactant available under the trade name MAZON from PPG Industries, Inc., Pittsburgh, Pa.).

The exemplary small molecule is an antifoulant agent. As used herein an antifoulant agent is a small molecule or composition containing a small molecule, which is capable of repelling biofoulants and/or reducing or eliminating the buildup of biofoulants in aquatic environments. Exemplary antifoulant agents are organic molecules and compositions comprising one or more organic molecules. Included among these are menthol propylene glycol carbonate; menthol ethylene glycol carbonate; menthol and menthol derivatives, such as trans-p-menthan-3,8-diol, menthyl chloride, isopulegol (5-methyl-2-prop-1-en-2-ylcyclohexan-1-ol), and menthone isothiazolones, such as 4,5-dichloro-2-n-octyl4-isothiazolin-3-one; organotin compounds, such as bis (tributyltin) adipate, bis(tributyltin) sulfide, bis(tributyltin) sulfone, and triphenyltin fluoride; copper-based biocides, such as copper pyrithione; zinc pyrithione; tetramethyl thiuram disulphide, methylene bis(thiocyanate); captan; triphenylboron-pyridine; 2-methylthio-4-tertbutylamino-6-cyclopropylamino-s-triazine; N-3,4-dichlorophenyl-N',N'-dimethyl-urea; 2-(thio-cyanomethylthio)benzothiazole; 2,4,5,6-tetrachloro-isophthalonitrile, 2-(p-chlorophenyl)-3-cyano-4-bromo-5-trifluoromethylpyrrole; 3-butyl-5-(dibromomethylidene)-2(5H)-furanone; 3-(benzo(b)thien-2-yl)-5,6-dihydro-1,4,2-oxathiazine4-oxide; 5-methyl-2-(isopropyl)-cyclohexanol; isoproturon; thiabenzadole; dodecylguanidine monohydrochloride; chlorotoluron; cis-4-[3-(4-tert-butylphenyl)-2-methylpropyl]-2,6-dimethylmorpholine; fluometuron, folpet, prometryn; chlorofenapyr; chloromethyl n-octyl disulphide; 2,3,5,6-tetrachloro-4-(methyl-sulphonyl)pyridine; 4-bromo-2-(4-chloro-phenyl)-5-(trifluoromethyl)-1H-pyrrole-3-carbonitriles and salts thereof, and combinations thereof.

For environmental reasons, antifoulants based on heavy metals such as tin or copper are to be avoided.

Exemplary antifoulant compositions are described in U.S. Pub No. 2006/0217456, the disclosure of which is incorporated herein by reference. Such compositions include menthol and/or isopulegol, and a compound of the general formula (I):

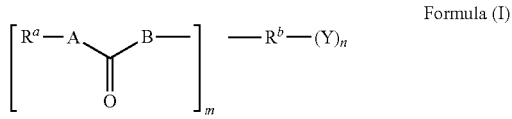

Formula (I)

wherein $R^a$ denotes a $C_4$-$C_{20}$-alkyl, a $C_5$-$C_{20}$-cycloalkyl, a $C_5$-$C_{20}$ heterocycloalkyl, a $C_5$-$C_{20}$-alkoxy, a $C_6$-$C_{12}$-aryl, a $C_6$-$C_{10}$-heteroaryl, or $C_7$-$C_{11}$-aralkyl. $R^b$ denotes an m+w n-valent aliphatic $C_1$-$C_8$ radical, a cycloaliphatic or heterocycloaliphatic $C_3$-$C_{15}$ radical, an aryl-aliphatic $C_7$-$C_{20}$ radical, an alkoxy- or acyloxy-containing aliphatic $C_3$-$C_{15}$ radical. A and B are independently selected from —O—, —S— or —NH—. Y denotes hydroxy, $C_1$-$C_{10}$-alkoxy, $C_2$-$C_6$-acyloxy, amino, mercapto or —O—Z—O—. Z denotes $C_1$-$C_6$-alkylene. w denotes the valency of the radical Y. m and n independently of one another denote integers from 1 to 8, with the proviso that the sum of m+n is not more than 12. The composition may include a film forming agent.

The compound of formula (I), which is the active ingredient in the antifoulant composition, can be present in an amount from about 0.01 to about 50 percent by weight of the antifoulant composition, and in one embodiment, at least 25% of the antifoulant composition. The active ingredient can be selected from menthol glycol carbonate, menthol propyleneglycol carbonate, and menthol glycerin carbonate. A ratio of menthol propylene glycol carbonate:isopulegol:menthol may be about 1:2:1.

An exemplary antifoulant composition of this type, which includes menthol, isopulegol, and the active component menthol propyleneglycol carbonate, is sold under the tradename FRESCALIN by Symrise and contains 25-50% menthol propyleneglycol carbonate, isopulegol, and menthol. It is designed to be a non-toxic anti-foulant for repelling barnacle growth in marine environments.

In the reactant liquid, the surfactant may be present in a concentration of 10-70 wt % of the aqueous acid, and in one embodiment, less than about 50%. The exemplary surfactant has hydrophilic groups, such as long ethylene oxide chains, and thus at high levels, the surfactant can swell when immersed in water, leading to degradation of the silica framework. Accordingly, a ratio of surfactant to silica, by weight, may be from about 0.05:1 to 1:1, e.g., at least 0.2:1, and in one embodiment, up to 0.8:1. In one embodiment, the weight ratio of surfactant to silica is up to 0.5:1 and in one specific embodiment, is up to 0.4:1 or 0.3:1. The same approximate ratios are also applicable to the final composite.

A molar ratio of water to organic polar solvent may be from about 4:1 to about 0.8:1, e.g., 3:1 to 1:1.

A ratio of small molecule to surfactant may be from about 0.5:100 to about 1:1.

An exemplary reactant liquid is formed by combining water, optionally, organic polar solvent, an acid in a catalytic amount, and expressed as parts by weight (pbw) as shown in TABLE 1:

TABLE 1

| | |
|---|---|
| silica precursor | 100 pbw (expressed in terms of silica) |
| antifoulant composition | 0.1-20 pbw (of which about 25%-50% may be the active component), e.g., at least 2 pbw, and can be up to 15 pbw, e.g., up to 10 pbw or up to 5 pbw |
| surfactant | at least 5 pbw, e.g., at least 10 pbw and can be up to 100 pbw, and in some embodiments, no more than 80 pbw, e.g., 75 pbw or less, such as 60 pbw or less and in one embodiment, about 50 pbw or less. |

The resulting composite material can include silica, surfactant and antifoulant composition in the same amounts as in Table 1 and in one embodiment, the composite may contain up to 10 pbw of all other components (i.e., other than silica, antifoulant composition, and surfactant).

Other materials may be present at less than 10 wt % of the composite material.

In the case of an EO/PO block copolymer, the polymer tends to swell in water, such as seawater. Accordingly, to maintain long term integrity of the composite material, surfactant to silica ratio is no more than 0.8:1, and in some embodiments no more than 0.5:1.

Exemplary Synthesis of Amphiphilic Block Copolymer-Templated Organosilica Monoliths Composite materials may be synthesized with molar ratios as follows: 1 Si: 1.13-2.82 methanol (MeOH), 0.00271 hydrochloric acid (HCl): 3.01 water ($H_2O$). Silica precursors, such as bis(trimethoxysilylethyl)benzene (DEB) and/or tetramethyl orthosilicate (TMOS) are mixed with the solvent, e.g., water and methanol. Triblock copolymer PLURONIC F127 is added in an amount that is equal to 20-70 wt % of the aqueous acid and surfactant mixture (i.e., wt surfactant/wt surfactant plus water). FRESCALIN (a mixture of menthol, isopulegol, and the active component menthol propylene glycol carbonate) is added at from about 1-50 wt % of the total of PLURONIC F127 plus FRESCALIN.

To form the composite, the PLURONIC F127 and FRESCALIN are dissolved in the silica precursor or precursors and methanol with stirring at 60° C. Aqueous acid is added dropwise and the mixture is stirred until it is homogeneous. The mixture is then poured into a suitably shaped container for gelation dependent on the final shape of the monolith that is desired. A light vacuum is applied at room temperature to remove alcohol that may disrupt micellization of aqueous F127. The vacuum is applied lightly enough to avoid boiling the methanol. The translucent mixture becomes viscous and eventually gels. The gel is covered and aged at room temperature for 3 days, then heated at 80° C. for 1 to 2 days to cure.

Controlled Release

The rate of release of the small molecule can be evaluated by submerging a test sample in water, such as seawater. The test sample can be a monolith of the composite material or a substrate with a film or paint comprising the composite material. An artificial sea water to be used in the tests can be prepared by dissolving sea salts in deionized water to a concentration of about 40 g/L. Alternatively, actual seawater or freshwater can be used. To simulate water movement, the submerged monolith or other test sample can be shaken in a vial with the artificial seawater. After a period of exposure, the test sample is removed and the liquid collected. The small molecule may then be extracted from the liquid using an organic solvent, such as ether. The ether extract can be analyzed, e.g., by gas chromatography (GC) to determine the amount of small molecule released.

The test can be repeated using different exposure times to generate a plot of small molecule released vs. time.

Monoliths synthesized as described above with 70 wt % PLURONIC F127 in aqueous acid were found to survive submergence in simulated sea water only temporarily, 1 day at most. The hydrophilic poly(ethylene oxide) blocks swell with water even when encased in the organosilica matrix, breaking apart the monolith. Preparing a monolith with 50 wt % PLURONIC F127 in aqueous acid and 100 mol % DEB-Si was found to provide indefinite survival (at least 20 days) of the monolith in an aqueous environment.

Pore volume and pore size measured as described below, were found to be dependent on a number of factors, including proportion of surfactant used. For example, addition of 6.67 wt % FRESCALIN in PLURONIC F127 to a 30 mol % DEB-Si: 70 mol % Si TMOS monolith (see monolith J in Example 2 below) increased pore volume from 0.508 to 0.548 cm$^3$/g and the pore size from 43 to 50 Å. Incorporation of 12.5 wt % FRESCALIN in PLURONIC F127 (see monolith K In Example 2 below) resulted in a pore volume of 0.616 cm$^3$/g and pore size 57 Å.

Optical clarity in a monolith was found not to be affected by the inclusion of FRESCALIN.

Experiments in synthetic seawater indicate that release rates are affected by the amounts of block copolymer and FRESCALIN included in the synthesis. A higher loading of FRESCALIN may increase the total amount released by its swelling effect on the block copolymer, allowing more access to the aqueous environment. Release rates may also be affected by choice of surfactant and precursors, and the extent to which templating results in an ordered micro- or mesostructure. Although much of the FRESCALIN in the materials described herein remains encapsulated, the duration of release on the order of weeks which can be obtained with the exemplary composite materials exceeds that reported for existing mesoporous materials for controlled release of drugs.

Without intending to limit the scope of the exemplary embodiment, the following examples illustrate the method.

EXAMPLES

Materials

Tetramethyl orthosilicate (TMOS) 98%, hydrochloric acid (HCl) 37%, and methanol (MeOH) 99.93% HPLC grade were obtained from Aldrich; sea salts were obtained from Sigma, anhydrous ether 99+% was obtained from Sigma-Aldrich; bis(trimethoxysilylethyl)benzene (DEB, contains mixed isomers) from Gelest, Inc., and ethanol 100% from the Warner-Graham Company. Pluronic F127 Prill surfactant, a triblock copolymer with representative formula $EO_{106}PO_{70}EO_{106}$ (EO=ethylene oxide, PO=propylene oxide) was obtained from BASF and FRESCALIN from Symrise GmbH & Co. KG, Holzminden, Germany. FRESCALIN is sold as a mixture of ≧50% (−)-isopulegol, 25-49.99% (1R,2S,5R)-(−)-menthol, and 25-49.99% menthol propylene glycol carbonate. This was confirmed experimentally by gas chromatography-mass spectrometry (GC/MS). All water was purified to 18.2 Ωcm by a Millipore Corporation Milli Q UV Plus water system.

Characterization of the Composite Material

The porosity of the silica material can be evaluated by removal of the surfactant (and small molecule) from the pores. For example, PLURONIC F127 and FRESCALIN can be removed by refluxing the monolith in acidic ethanol (1 M HCl) to yield a porous material. Template removal by this method often reduces the clear monolith to an opaque powder, but allows characterization techniques to be applied to determine pore/channel size, surface area, and pore/channel volume. In monoliths synthesized with 70 wt % F127 in aqueous acid, porosity characteristics were found to vary with the relative amounts of DEB and TMOS.

In the following examples, to extract the block copolymer from the materials, the monoliths were refluxed in 1M HCl in ethanol up to three times for durations of at least 12 hrs. This resulted in powders that were then washed with ethanol, then deionized water, and then dried under vacuum at 90° C. for 6 hrs.

Gas chromatography analysis was performed on the Shimadzu GC-2010 with a FID detector using a Rtx-5 Restex 30 m, 0.25 mmID column.

In the following examples, $N_2$ sorption experiments were performed on on PLURONIC F127-extracted samples using a Micromeritics ASAP 2010 at 77 K. Samples were degassed to 1 μm Hg at 100° C. prior to analysis. Surface area was determined by use of the Brunauer-Emmett-Teller (BET) method, pore size was calculated by the Barrett-Joyner-Halenda (BJH) method from the adsorption branch of the isotherm, and total pore volume by the single point method at relative pressure $(P/P_0)$ 0.97.

Thermogravimetric analysis was performed using a TA Instruments Hi-Res 2950 Thermogravimetric Analyzer under a $N_2$ atmosphere; temperature was ramped 5° C./min to 800° C.

Powder X-ray diffraction patterns were obtained with a Rigaku high-resolution powder diffractometer with 18 kW CuKα radiation derived from a high-power Rigaku rotating anode X-ray generator. PLURONIC F127-extracted samples were ground to a fine powder and set on glass slides in silicone vacuum grease for analysis.

Example 1

(Comparative) Monoliths with DEB:TMOS at Different Ratios without Small Molecule Monoliths were prepared at different ratios of DEB-Si: TMOS-Si (expressed in terms of silica) using (bis(trimethoxysilylethyl)benzene) and tetramethyl orthosilicate as silica precursors. The monoliths were synthesized using a molar ratio of 1Si:1.13-2.82MeOH:0.00271HCl:3.00 $H_2O$. PLURONIC F127 was used at 50-70 wt % of the total weight of aqueous acid and surfactant. Typical syntheses of monoliths A, B and C are exemplary.

To form the monoliths A, B and C, 3.50 g of PLURONIC F127 was dissolved in the silica precursor(s) and 1.0 g MeOH with stirring at 60° C. This is similar to syntheses described by EI-Safty et al. in that the block copolymer was added to and made homogeneous with the silicate precursors as opposed to first dissolving it in aqueous solution. (See. S. A. EI-Safty, J. Evans, J. Mater. Chem. 12 (2002) 117-123; and S. A. EI-Safty, T. Hanaoka, Chem. Mater. 15 (2003) 2892-2902).

1.50 g of 0.05 M HCl was added dropwise while continuing to stir, resulting in PLURONIC F127 being 70 wt % of the combined weight of aqueous acid plus PLURONIC F127 (referred to herein as 70% PLURONIC). The acid catalyzed hydrolysis of the silanes is exothermic and some boiling of MeOH was often observed. The clear mixture was poured into a container for gelation, usually a plastic jar or a Petri dish, and a light vacuum was applied at room temperature for 30 min to remove alcohol that could disrupt formation of a block copolymer liquid crystal. This caused the mixture to become more viscous and eventually gel. The gel was covered and allowed to age for 3 days, then cured in an oven at 80° C. for 2 days.

The monoliths used DEB:TMOS molar ratios as shown in TABLE 1. The resulting gel was typically shrunken in size compared to the wet mixtures, with more shrinkage occurring in materials with greater incorporation of DEB, as shown in TABLE 2. The cured monoliths were robust enough that they could be easily handled without breaking.

TABLE 2

| SAMPLE | DEB:TMOS ratio (expressed as moles of silica) | Amounts used DEB | Amounts used TMOS | Shrinkage (volume of monolith/ volume of gel) |
|---|---|---|---|---|
| A | 50:50 | 2.60 g | 2.11 g | 83% |
| B | 30:70 | 1.56 g | 2.94 g | 90% |
| C | 70:30 | 3.62 g | 1.27 g | 75% |

Example 2

Preparation of DEB-Si and TMOS-Si Monoliths with Encapsulated FRESCALIN™

Diethylbenzene-bridged monoliths were prepared by the method described for Example 1, with FRESCALIN antifoulant added to the block copolymer-silicate mixture prior to addition of aqueous acid. Monoliths were also prepared from TMOS-Si and mixtures of the two precursors. TABLE 3 summarizes the amounts of ingredients used in preparing the following monoliths.

A monolith D was prepared as follows: 1.5 g block copolymer (Pluronic F127) was dissolved in 5.19 g DEB and 2.5 g MeOH at 60° C. while stirring. 1.0 g of FRESCALIN was added to the stirring mixture, followed by 1.50 g of 0.05 M HCl. (i.e., FRESCALIN was 40 wt % of the combined weight of PLURONIC F127 and FRESCALIN). In this example, Pluronic F127 had a concentration in aqueous acid of 50 wt %. The clear mixture was poured into a container. A light vacuum was applied to remove alcohol. The gel was covered and aged at room temperature 3 days, then cured at 80° C. 2 days. The resulting monolith D contained FRESCALIN and PLURONIC 127 in approximately the same weight ratio as for the reactant mixture (Ratio of FRESCALIN:PLURONIC 127=1:1.5).

A DEB-Si monolith E was prepared as for D, but used a mixture of 1.5 g of PLURONIC F127 and 0.25 g of FRESCALIN. (i.e., FRESCALIN was 14.3 wt % of the combined weight of PLURONIC F127 and FRESCALIN). 1.50 g of 0.05 M HCl was added dropwise while continuing to stir, resulting in PLURONIC F127 being 50 wt % of the combined weight of aqueous acid plus PLURONIC F127.

A monolith F was prepared as for E but using 0.1 g FRESCALIN, 1.0 g PLURONIC F127 and 100% TMOS (4.22 g) as the precursor. 1 g of methanol was used as the solvent and 1.5 g of 0.05 M HCl was used as the catalyst. Molar ratio 1 Si:1.13 methanol:0.00271 hydrochloric acid:3.01 water. This was equivalent to 40 wt % PLURONIC F127 in water, 9.09 wt % FRESCALIN in PLURONIC F127.

A monolith G was prepared as for F, but used only 0.25 g Frescalin. Molar ratio 1 Si:1.13 methanol:0.00271 hydrochloric acid:3.01 water, equivalent to 40 wt % Pluronic F127 in water, 20 wt % Frescalin in F127. (Ratio of FRESCALIN:PLURONIC 127=1:4).

A DEB:TMOS-Si monolith J was prepared using 30 mol % DEB-Si: 70 mol. % TMOS-Si (1.56 g DEB and 2.95 g TMOS) with 0.25 g FRESCALIN, 3.5 g PLURONIC F127 (6.67 wt % FRESCALIN in PLURONIC F127), 1 g methanol and 1.5 g 0.05M HCl. Molar ratio 1 Si:1.13 methanol:0.00271 hydrochloric acid:3.01 water.

A DEB:TMOS-Si monolith K was prepared as for J using 30 mol % DEB-Si: 70 mol. % TMOS-Si but with 0.5 g FRESCALIN (12.5 wt % FRESCALIN in PLURONIC F127). Molar ratio 1 Si:1.13 methanol:0.00271 hydrochloric acid:3.01 water.

As a comparative example, a Monolith L was prepared as for D, but without surfactant. Specifically, to 5.19 g DEB and 2.5 g MeOH at 60° C. while stirring, 1.0 g of FRESCALIN was added, followed by 1.50 g 0.05 M HCl. The clear mixture was poured into a container. A light vacuum was applied at room temperature for 30 min to remove alcohol. The gel was covered and aged at room temperature 3 days, then cured in an oven at 80° C. for 2 days.

TABLE 3

Weights of Components

| Monolith | DEB (g) | DEB mmol SiO$_2$ | TMOS (g) | TMOS mmol SiO$_2$ | F127 (g) | Frescalin (g) | DEB:TMOS (mol. SiO$_2$) | Frescalin: Pluronic (weight ratio) | Surfactant: silica precursor weight ratio |
|---|---|---|---|---|---|---|---|---|---|
| A | 2.6 | 13.88 | 2.11 | 13.86 | 3.5 | 0 | 50:50 | 0 | 0.74 |
| B | 1.56 | 8.32 | 2.94 | 19.31 | 3.5 | 0 | 30:70 | 0 | 0.78 |
| C | 3.62 | 19.31 | 1.27 | 8.32 | 3.5 | 0 | 70:30 | 0 | 0.72 |
| D | 5.19 | 27.71 | 0 | 0 | 1.5 | 1 | 100:0 | 1:1.5 | 0.29 |
| E | 5.19 | 27.71 | 0 | 0 | 1.5 | 0.25 | 100:0 | 1:6 | 0.29 |
| F | 0 | 0 | 4.22 | 27.72 | 1 | 0.1 | 0:100 | 1:10 | 0.24 |
| G | 0 | 0 | 4.22 | 27.72 | 1 | 0.25 | 0:100 | 1:4 | 0.24 |
| J | 1.5 | | 2.95 | | 3.5 | 0.25 | 30:70 | 1:14 | |
| K | 1.5 | | 2.95 | | 3.5 | 0.5 | 30:70 | 1:7 | |
| L | 5.19 | 27.71 | 0 | 0 | 0 | 1 | 100:0 | — | — |

Characterization

Samples of monoliths A-K were characterized as described above.

Surface Area and Pore Volume Results

Figure 4:
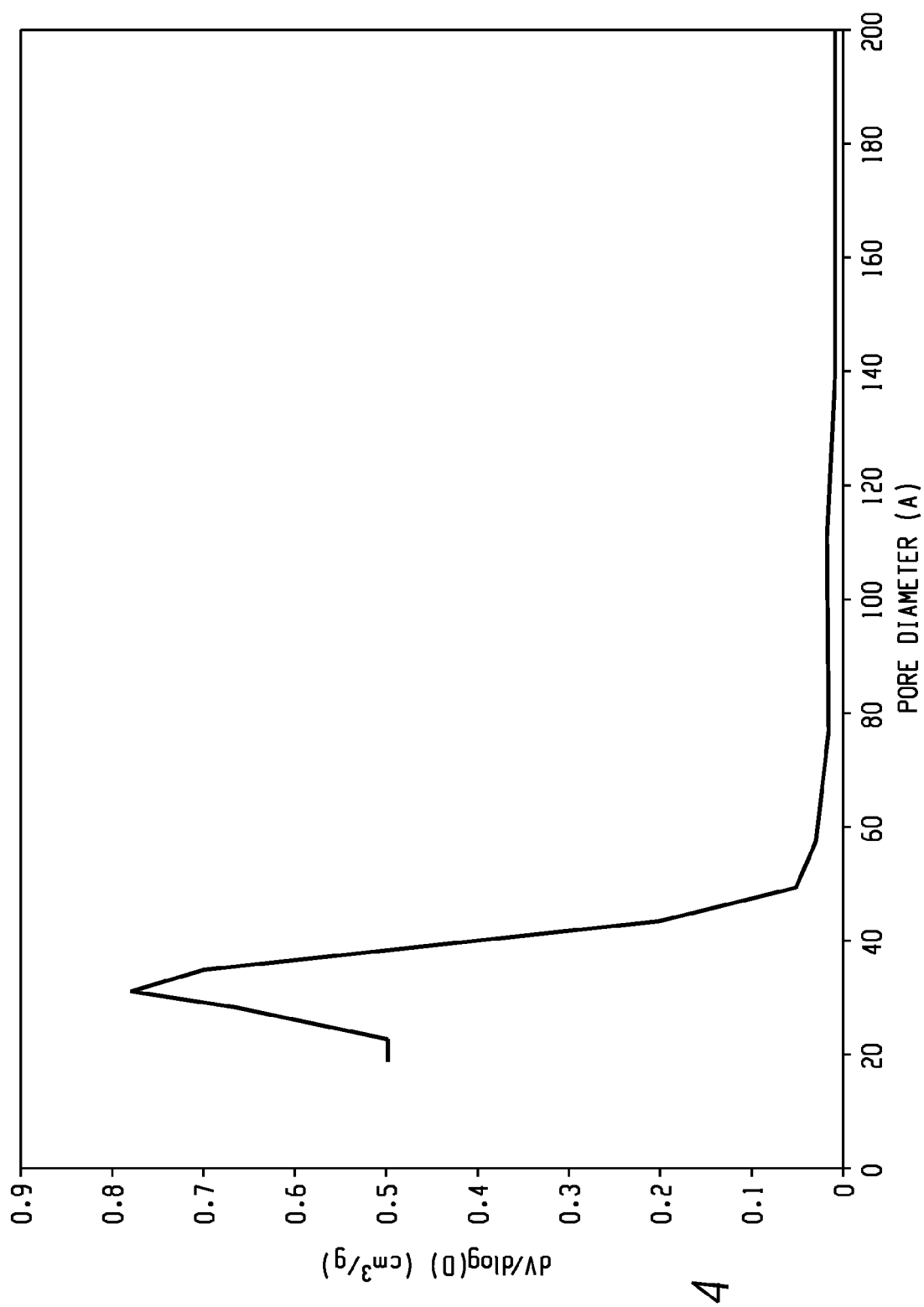
FIGS. 4 and 5 show BJH adsorption pore size distributions for surfactant extracted Si composites.
Figure 5:
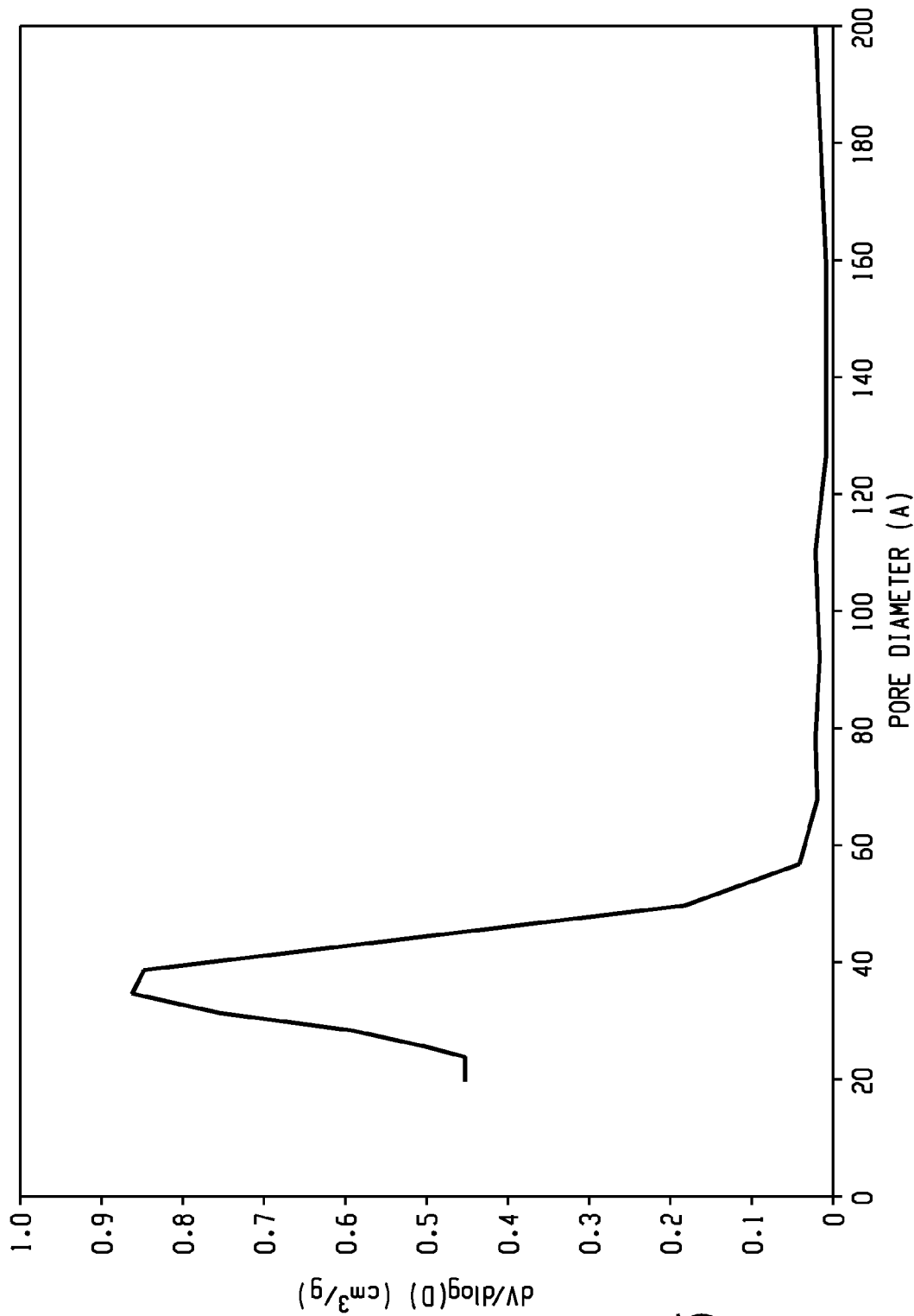

The BET method was used as described above to characterize pore volumes for samples of some of the above described materials after surfactant-extraction. $N_2$ sorption results for these differed considerably, as illustrated in TABLE 4. The nitrogen sorption results showed that the extracted powders from DEB-Si monoliths were not mesoporous, but higher loading of FRESCALIN slightly improved their porosity characteristics, suggesting that the added FRESCALIN caused some swelling of PLURONIC F127 micelles. High surface areas/pore volumes were found for the TMOS-Si monoliths F and G. BJH adsorption pore size distributions for F and G are shown in FIGS. 4 and 5.

TABLE 4

| Sample | BET surface area (m²/g) | Total pore volume (cm³/g) | BJH adsorption pore size (Å) |
|---|---|---|---|
| D | 179 | 0.0868 | |
| E | 12 | 0.0113 | |
| F | 444 | 0.283 | 32 |
| G | 436 | 0.303 | 35 |
| J | 606 | 0.548 | 50 |
| K | 628 | 0.616 | 57 |
| L | 5 | 0.00324 | |

Integrity in Water

Monolithic integrity in water of the PLURONIC/FRESCALIN monoliths was favored by higher DEB-Si loadings (≧70% DEB-Si lasted longer than 30% DEB-Si) and also by lower PLURONIC F127 concentration (50% PLURONIC F127 lasted longer than 70% PLURONIC F127). The long ethylene oxide chains of PLURONIC F127 are hydrophilic and can apparently swell enough to break up a monolith, especially when present in high concentrations. High loadings of DEB may increase the hydrophobicity of a monolith's framework and it may also reduce a material's meso- or microstructure, which would render diffusion of water into the nanocomposite more difficult. A monolith synthesized with 100 mol % DEB-Si and a 50 wt % aqueous PLURONIC F127 survived indefinitely in water with no visible deterioration in integrity and optical clarity.

Controlled Release

Figure 6:
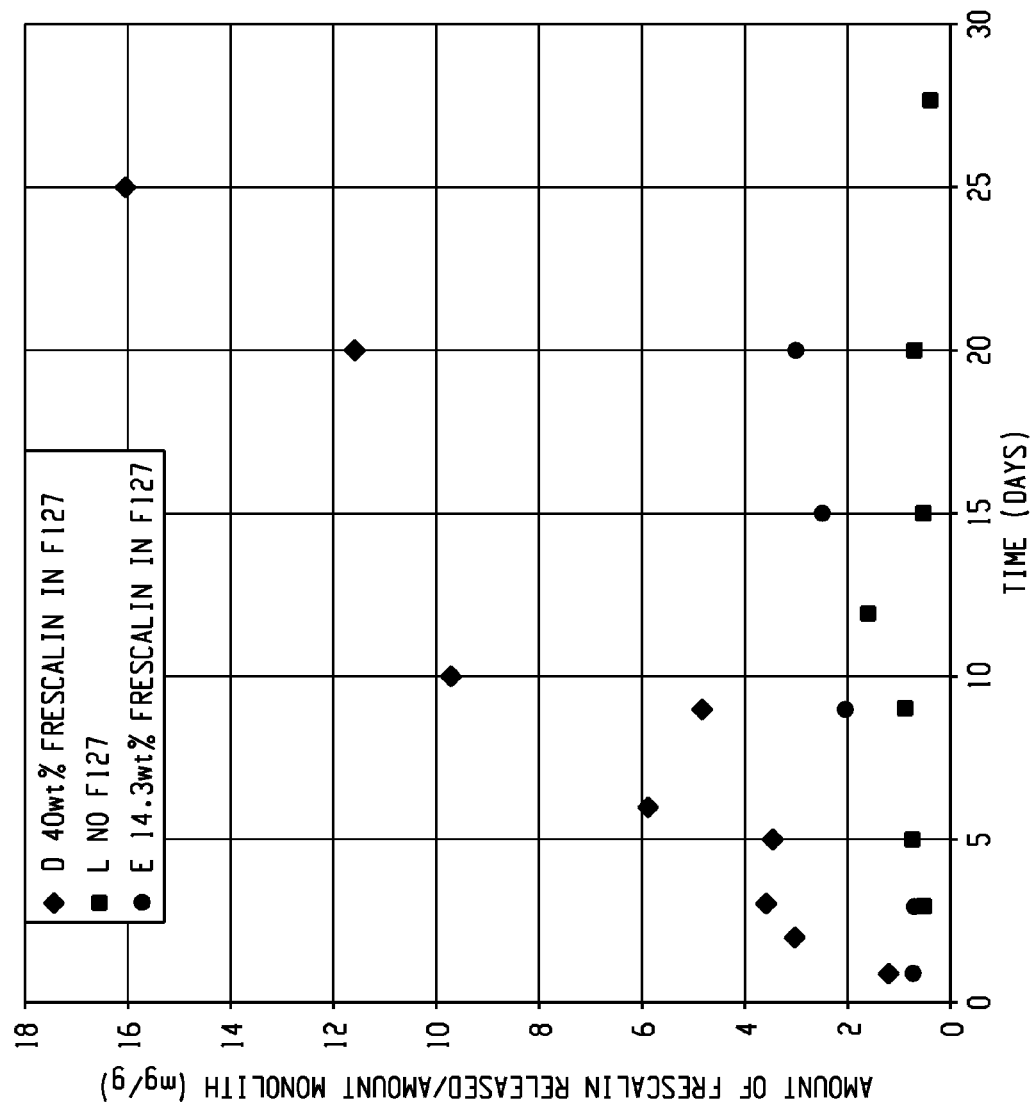
FIGS. 6 and 7 show the results of controlled release experiments on DEB-Si/PLURONIC F127/FRESCALIN composites.
Figure 7:
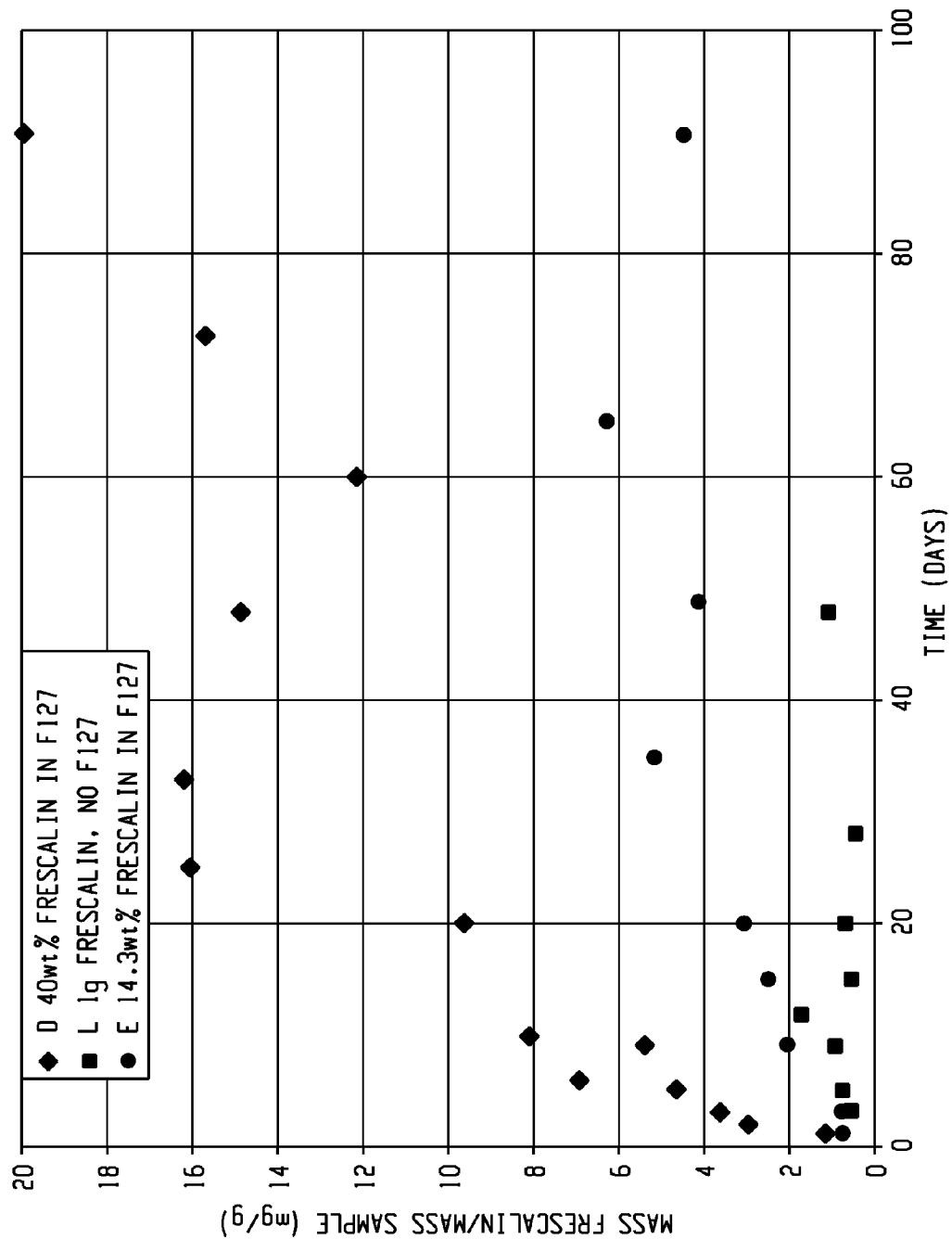

Artificial sea water was prepared by dissolving sea salts in deionized water to a concentration of 40 g/L. A monolith section of about. 0.1 g was submerged in 5 mL of simulated sea water in a vial and rotated on a rotisserie shaker for a determined period at room temperature. The liquid was collected and FRESCALIN was extracted with 5 mL of ether. The ether extract was analyzed by GC and the amount of released FRESCALIN was determined from a calibration curve. The experiment was repeated for different time periods of up to 90 days. The tests were performed at room temperature (temperatures that were usually in the range of 22-25° C. over 90 days). The results for samples E, F, and L are shown in FIGS. 6 and 7.

The D monolith (synthesized with 40 wt % FRESCALIN in PLURONIC F127) releases the FRESCALIN steadily up to at least 25 days. The E material containing less FRESCALIN (synthesized with 14.3 wt % FRESCALIN in PLURONIC F127) also releases FRESCALIN steadily in sea salt water up to at least 20 days, but in expectedly smaller amounts. The L monolith material (synthesized with the higher amount of FRESCALIN but without any block copolymer) releases very little anti-foulant. No more FRESCALIN is released after 28 days than after 3 days, indicating that most of the anti-foulant chemical mixture is encapsulated too strongly in the organosilica matrix to escape into the aqueous environment.

Thermogravimetric analysis (TGA) indicated that FRESCALIN accounted for approximately 15 wt % of the D material, as indicated by a mass loss between 100-300° C. The release profile of the D monolith, as measured by GC on the ether extracted water (FIG. 7) indicated that it could release at least 16 mg of FRESCALIN per 1 g of loaded monolith, which was about 11% of the total amount. The E monolith released 5 mg of FRESCALIN per 1 g of monolith. FRESCALIN accounted for approximately 6.5 wt % of the loaded E monolith and released 8% of its load.

These examples demonstrate the applicability of the composite materials for delayed release of an anti-foulant in seawater environments. It is to be appreciated that in an actual aquatic environment, with an unlimited supply of water, where the seawater around the monolith is being continuously replaced, faster release of the small molecule may occur. Additionally, temperature may affect release rates. The temperature of seawater can vary considerably, but may be expected, on average, to be somewhat lower than the 22-25° C. used in these tests.

Example 3

Effect of DEB:TMOS Ratio on Pore Structure

A series of materials was prepared as for monolith A using 70 wt % PLURONIC F127 concentration in aqueous acid with different amounts of DEB incorporated into the silicate walls, the balance being TMOS: a) 10 mol % DEB-Si, b) 20 mol % DEB-Si, c) 30 mol % DEB-Si, d) 40 mol % DEB-Si, e) 50 mol % DEB-Si, f) 60 mol % DEB-Si, g) 70 mol % DEB-Si, h) 80 mol % DEB-Si, i) 90 mol % DEB-Si, and j) 100 mol % DEB-Si).

Nitrogen adsorption-desorption isotherms of these DEB-TMOS $SiO_2$ materials, after extraction of PLURONIC F127 were obtained. Powders with 10-70 mol % Si from the DEB precursor yielded type IV nitrogen adsorption-desorption isotherms characteristic of mesoporous materials. Isotherms of organosilicas with 10-50 mol % DEB-Si exhibited considerable hysteresis between the adsorption and desorption branches of the curves of type H2 shape. This may result from "ink-bottle" pores, or pores with narrow mouths. However, the hysteresis loops closed near a relative pressure of 0.4, which is the approximate lower pressure limit of adsorption-desorption hysteresis for nitrogen at 77 K and can occur for materials with relatively uniform pore channels. (See M. Kruk, M. Jaroniec, Chem. Mater. 13 (2001) 3169-3183) Type I isotherms of microporous materials were observed for samples that incorporated 80, 90, and 100 mol % Si from DEB.

Nitrogen sorption data for these materials are shown in TABLE 5.

TABLE 5

Nitrogen sorption data for surfactant-extracted organosilica materials with diethylbenzene (DEB) bridges

| Sample | Mol % Si from DEB | BET surface area (m²/g) | Total pore volume (cm³/g) | Pore size (Å) |
|---|---|---|---|---|
| a | 10 mol % DEB-Si | 389 | 0.336 | 39 |
| b | 20 mol % DEB-Si | 424 | 0.337 | 40 |
| c | 30 mol % DEB-Si | 639 | 0.508 | 43 |
| d | 40 mol % DEB-Si | 669 | 0.497 | 43 |
| e | 50 mol % DEB-Si | 535 | 0.392 | 38 |
| f | 60 mol % DEB-Si | 568 | 0.370 | 32 |

TABLE 5-continued

Nitrogen sorption data for surfactant-extracted organosilica materials with diethylbenzene (DEB) bridges

| Sample | Mol % Si from DEB | BET surface area (m$^2$/g) | Total pore volume (cm$^3$/g) | Pore size (Å) |
|---|---|---|---|---|
| g | 70 mol % DEB-Si | 519 | 0.325 | 31 |
| h | 80 mol % DEB-Si | 452 | 0.269 | not measured |
| i | 90 mol % DEB-Si | 457 | 0.260 | not measured |
| j | 100 mol % DEB-Si | 179 | 0.100 | not measured |

Materials with 10-70 mol % Si from DEB were mesoporous with pore volumes in the range 0.32-0.50 cm$^3$/g, pore sizes in the range 31-43 Å, and surface areas of about 400-670 m$^2$/g. Desorption branches of isotherms for products with ≧60 mol % DEB-Si did not close with the adsorption branches at low relative pressures (P/P$_0$).

Powder X-ray diffraction patterns for surfactant-extracted materials containing 10-80 mol % DEB-Si displayed one low angle reflection; this peak was of very low intensity for the 70 mol % DEB-Si material and hardly observable for 80 mol % DEB-Si. The appearance of one reflection is consistent with mesoporous silicas having uniform channel dimensions without long range order in their pore systems (S. A. Bagshaw, E. Prouzet, T. J. Pinnavaia, Science 269 (1995) 1242-1244; S. A. Bagshaw, T. J. Pinnavaia, Angew. Chem. Int. Ed. Engl. 35 (1996) 1102-1105).

Diethylbenzene bridges between Si atoms are more flexible than functional groups such as benzene, thiophene, and biphenyl bridges, so it is more difficult to obtain an ordered mesostructure upon removal of the surfactant template. Typically, greater incorporation of DEB results in less order in the mesostructure and lower porosity values. This was certainly the case in surfactant extracted samples containing 50 mol % DEB-Si or greater, but the higher surface area and pore volume values for 30-40 mol % DEB-Si materials indicated that some DEB incorporation was beneficial for this particular system. The 10-70 mol % DEB-Si materials had narrow pore size distributions.

Example 5

Evaluation of the Effect of Surfactant Concentration

A series of TMOS only based monoliths was prepared, as described for monolith A, but varying the PLURONIC F127 concentration from 40-70 wt %, based on the combined weight of surfactant and aqueous acid, to determine the optimum amount to attain the best mesoporous silica from this system. The results are shown in TABLE 6.

A product synthesized without DEB using TMOS as sole precursor and a PLURONIC F127 concentration of 70 wt % in aqueous acid had relatively poor mesoporosity.

TABLE 6

Nitrogen sorption data for surfactant-extracted silica materials prepared using TMOS as the sole precursor

| Concentration of F127 (wt %) in aqueous acid | BET surface area (m$^2$/g) | Total pore volume (cm$^3$/g) | Pore size (Å) |
|---|---|---|---|
| 40 | 302 | 0.109 | 30 |
| 45 | 396 | 0.214 | 45 |
| 50 | 409 | 0.381 | 65 |
| 60 | 224 | 0.181 | 56 |
| 70 | 377 | 0.263 | not measured |

The surfactant extracted materials all exhibited type IV nitrogen sorption isotherms, with those made from 45-60 wt % PLURONIC F127 concentrations having wide H2 type hystereses. Their corresponding pore size distributions are also notably wide. The highest surface area (409 m$^2$/g), pore volume (0.381 cm$^3$/g), and pore size (65 Å) were observed for the mesoporous silica templated with a 50 wt % PLURONIC F127 aqueous concentration. This material also had the most pronounced low angle reflection in its XRD pattern.

Comparing the tables, isotherms, and pore size distributions, it appears that combining the flexibility of DEB and the rigidity of TMOS with a relatively high concentration of PLURONIC F127 is optimal for higher surface area and a uniform pore size in this particular system. Synthesizing monoliths containing DEB using a concentration of PLURONIC F127 lower than 70 wt % of the aqueous acid was found to be unsuccessful at templating pores in the mesopore range (>20 Å) unless a pore swelling agent such as 1,3,5-trimethylbenzene was added (data not shown). It was as effective to simply increase the concentration of PLURONIC F127.

As-synthesized monoliths were optically transparent and could be cast into shapes on the centimeter scale. Greater incorporation of DEB did not affect the clarity of monoliths.

The data shown here suggest that the amounts of block copolymer and FRESCALIN included in a synthesis can significantly affect properties of the resulting monolith. A higher loading of FRESCALIN may increase the total amount released by its swelling effect on block copolymer, allowing more access to the aqueous environment. Release may also be affected by choice of surfactant and precursors and by the degree of ordered micro- or mesostructure. Although much of the FRESCALIN in the materials described here remained encapsulated, the duration of release on the order of weeks exceeds that of many mesoporous materials described in the literature for controlled release of drugs.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A composite material formulated for slow release of a small organic molecule in seawater comprising:
   a porous inorganic oxide framework comprising silica;
   micelles embedded within the pores of the framework, the micelles comprising a surfactant and a small organic molecule, the surfactant being present in the composite at no more than 80 parts by weight per 100 parts by weight inorganic oxide, the composite material being stable in seawater for releasing the small molecule over at least 20 days,
   wherein a ratio of moles of silica derived from bis(trimethoxysilylethyl)benzene:moles of silica derived from tetramethyl orthosilicate in the silica framework is at least 30:70,
   wherein the small organic molecule has a molecular weight of less than 1000, and
   wherein the small organic molecule comprises an antifoulant composition.

2. The composite material of claim 1, wherein the surfactant is present at no more than 60 parts by weight per 100 parts by weight inorganic oxide.

3. The composite material of claim 1, wherein the inorganic oxide framework comprises diethylbenzene bridges.

4. The composite material of claim 1, wherein a ratio of moles of silica derived from bis(trimethoxysilylethyl)benzene: moles of silica derived from tetramethyl orthosilicate in the silica framework is at least 40:60.

5. The composite material of claim 1, wherein the inorganic oxide framework has a mesoporous or microporous structure.

6. The composite material of claim 5, wherein pores of the inorganic oxide framework have an average pore diameter of less than 10 microns.

7. The composite material of claim 6, wherein pores of the inorganic oxide framework have an average pore diameter at least 2 nm.

8. The composite material of claim 1, wherein the inorganic oxide framework, as measured after surfactant extraction, has a BET surface area of at least 5 m$^2$/g.

9. The composite material of claim 1, wherein the antifoulant composition includes an active ingredient selected from menthol glycol carbonate, menthol propyleneglycol carbonate, menthol glycerin carbonate and combinations thereof.

10. The composite material of claim 9, wherein the antifoulant further comprises at least one of menthol and isopulgeol.

11. The composite material of claim 1, wherein the small molecule comprises at least 0.05 parts by weight per 100 parts by weight of silica in the composite material.

12. The composite material of claim 1, wherein the small molecule comprises up to 20 parts by weight per 100 parts by weight of silica in the composite material.

13. The composite material of claim 1, wherein the surfactant is a solid at 25° C.

14. The composite material of claim 1, wherein the surfactant comprises a block copolymer.

15. The composite material of claim 14, wherein the surfactant comprises a polyethylene/polypropylene block copolymer.

16. The composite material of claim 15, wherein the block copolymer has a weight average molecular weight of at least 5000.

17. The composite material of claim 1, wherein a ratio of the small molecule to surfactant is at least 1:100.

18. The composite material of claim 1, wherein a ratio of the small molecule to surfactant is up to 1:1.

19. The composite material of claim 1, wherein the micelles have an average diameter of at least 0.1 nm.

20. The composite of claim 1, wherein the composite material is in the form of a monolith with at least one of its dimensions being greater than 2 mm.

21. A sensing device comprising the monolith of claim 20 and a sensor.

22. The composite material of claim 1, wherein the monolith is optically clear.

23. A paint comprising the composite material of claim 1.

* * * * *